(No Model.)
G. P. CAMPBELL.
BRAKE PIPE COUPLING.
No. 402,300. Patented Apr. 30, 1889.
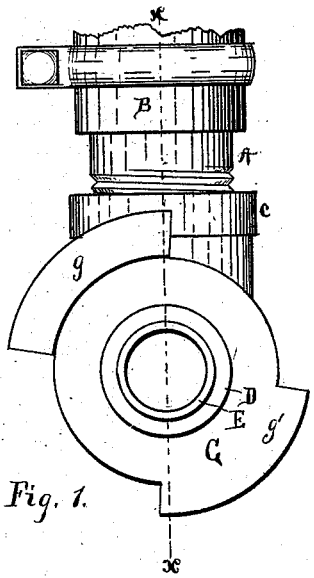
Fig. 1.
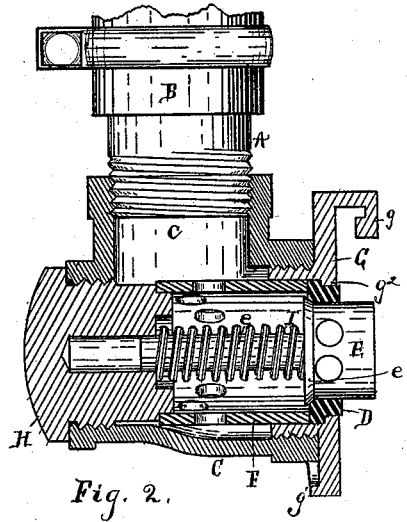
Fig. 2.
Fig. 3.
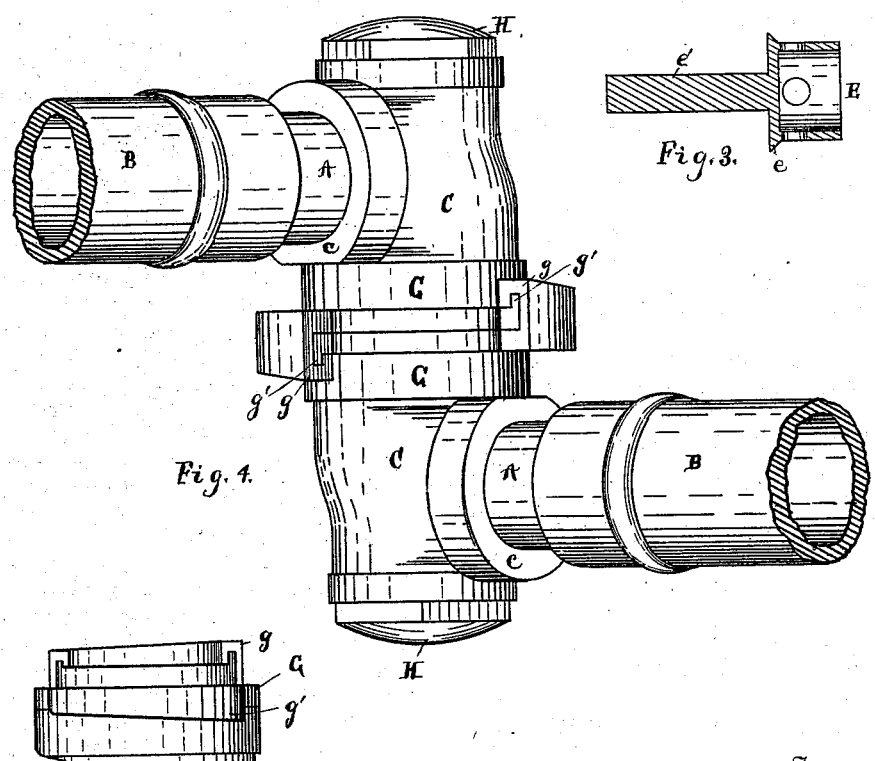
Fig. 4.
Fig. 5.
Witnesses,
C. W. Miles
A. W. Swartz
Inventor,
George P. Campbell.
By his Attorney Geo. F. Murray

UNITED STATES PATENT OFFICE.

GEORGE P. CAMPBELL, OF CINCINNATI, OHIO, ASSIGNOR TO THE FRICTION CAR BRAKE COMPANY, OF EAST ST. LOUIS, ILLINOIS.

BRAKE-PIPE COUPLING.

SPECIFICATION forming part of Letters Patent No. 402,300, dated April 30, 1889.

Application filed August 12, 1886. Serial No. 210,669. (No model.)

*To all whom it may concern:*

Be it known that I, GEORGE P. CAMPBELL, a citizen of the United States, and a resident of Cincinnati, in the county of Hamilton and State of Ohio, have invented certain new and useful Improvements in Brake-Pipe Couplings, of which the following is a specification.

My invention relates to an improved pipe-coupling device for car-brakes. Its object is a simple reliable device that can be readily coupled and will automatically uncouple in case of separation of the cars.

Referring to the drawings, in which like parts are represented by similar reference letters wherever they occur, Figure 1 is a side elevation of one member of the coupling device. Fig. 2 is a radial section of the valve and case, taken through line *x x* of Fig. 1. Fig. 3 is a longitudinal section of one of the valves. Fig. 4 is a top view of the device coupled together. Fig. 5 is a partial view in edge elevation of one of the coupling members with the valve, Fig. 3, removed.

The two halves of the coupling are exactly alike in construction, and are provided with the customary short metal tubes, A, to which the flexible pipes B are secured. The valve-case consists of a cast-metal shell, C, which has a lateral extension, *c*, into which the pipe A is screwed.

D is a rubber packing-ring, within which the valve E slides.

F is a short metal tube, perforated near its inner end to permit the passage of air through the perforations in the valve E when the valve is forced in from its seat by coupling the two members C C together.

In one branch of the coupling C is secured the piece G, which has an outwardly-projecting hooked end, *g*, and a downwardly-projecting flange, *g'*, to engage with the hooked part *g* of the opposite coupling to hold the opposite members firmly together in the position shown in Fig. 4. This piece G has also an inwardly-projecting shoulder or flange, $g^2$, to press upon the collar of the packing-ring D and hold it firmly upon the edge of the tube F. The opposite end of the tube fits around the reduced neck of the plug H, which is screwed into the opposite end of the coupling-piece C. The valve E has below its perforated shell a beveled flange, *e*, which is firmly seated against the inner edge of the rubber ring D when the valve is forced up to its seat by the coiled spring I. The plug H is bored to receive the stem *e'* of the valve E, and around the bore is an enlarged depression, upon the bottom of which is seated the spring I. The locking portions *g g'* of the piece G are inclined in opposite directions, as clearly shown in Fig. 5, so that the weight of the opposite duplicate members of the coupling are held firmly locked by the weight of the coupling when the two parts are united and suspended by the flexible hose B.

To unite the coupling, the outer edges of the opposite valves E are brought together, the pipes B being held in about a horizontal plane. As the opposite couplings are pressed together, the valves are forced in, thus forming a connection with the opposite pipe B through the perforations in the tubes F and valves E. The couplings are then partially rotated in opposite directions to lock the opposite members together by means of the hooked flanges *g g'*. The weight of the couplings will hold the members firmly locked until the cars are separated. The act of separation will bring the hose B to a horizontal position, partially rotate the members of the coupling, and uncouple them.

If desired, the case C and tube A may be cast in one piece, and it is also evident that the spring may be compressed within the bore in the block H, instead of being coiled around the valve-stem, as shown. The case C and locking member G may also be cast in one piece, and the ring D and tube F put in from the opposite end. In this case of course the plug H and plug-opening would have to be slightly enlarged; but the construction shown is the most economical.

What I claim as new is—

1. A pipe-coupling for car-brakes, composed of two similar sections, each section consisting of case C, coupling-piece G, secured in the open end of said case and having oppositely-inclined locking members *g g'* upon its opposite faces, the perforated tube F, and packing-ring D, held between the coupling-piece and said tube, and the spring-actuated valve E, having its reduced part projecting through the packing-ring, the whole combined and arranged substantially as specified.

2. In a pipe-coupling consisting of two equal parts, the combination, substantially as specified, of the valve-case C, locking-piece G, having hooks $g$ and flanges $g'$, inclining in opposite directions, the spring-actuated valves E, and the perforated tube F, with the branches A in the opposite couplings so arranged that the couplings will separate when they are brought into the same horizontal plane and to be locked when they are at an angle to each other.

GEORGE P. CAMPBELL.

Witnesses:
JOHN O. SLOAN,
WALTER E. BOYD.